Oct. 29, 1935.   F. A. HARRISON   2,018,785
MOLD FOR USE ON GLASS FORMING MACHINES
Filed March 4, 1935

INVENTOR:
Frederick A. Harrison
by [signature] Attorney

Patented Oct. 29, 1935

2,018,785

UNITED STATES PATENT OFFICE 2,018,785

MOLD FOR USE ON GLASS-FORMING MACHINES

Frederick Arthur Harrison, London, England, assignor to The United Glass Bottle Manufacturers Limited, London, England, a British company Application March 4, 1935, Serial No. 9,301
In Great Britain November 2, 1934

2 Claims. (Cl. 49—41)

This invention relates to the molds used on glass forming machines for the fabrication of glassware and particularly those which are used for forming hollow glassware.

Hitherto, such molds have usually been made of two parts or half-molds hinged together for movement about a vertically disposed pin, the mold being adapted to be opened and closed by mold arms suitably connected with the two parts and adapted to be brought into operation at the appropriate time by one or more cams or other suitable means. For instance, in the usual form of press and blow machine, a series of parison and finishing molds each comprising two hingedly connected half-molds are arranged for movement with a rotary framework about a vertically centrally disposed and stationary support carrying a plurality of cams by which the various elements of the machine are actuated in synchronized succession. As is well known, a mass of molten glass is first shaped or formed into a parison in one of the parison molds and is then transferred to a finishing mold where it is blown to its final form by the aid of compressed air. Alternatively, in a pressed ware machine, a pressing plunger or former is employed for applying the necessary pressure to the glass to give it the desired form or shape, the action of the plunger or former being, in some instances, supplemented by compressed air.

One of the principal difficulties which arises from the use of hingedly connected mold parts of the nature above indicated is that of ensuring the proper closing of the molds, that is to say, of ensuring that the two mold halves shall come together with their so-called meeting faces or radially disposed surfaces (in which the mold cavities are formed) in contact over their entire area.

With a view to overcoming this difficulty, it has previously been proposed to form the mold parts so that they are entirely separate and so that they are pivotally mounted in position upon a pair of pivotally or hingedly connected mold arms.

According to the present invention one or both of the mold parts is formed with portions fitting over a pair of vertically spaced pivot pins mounted in position upon one or both of the mold supporting arms, the arrangement being such that the mold part or parts is floating or free to move relatively to its support between certain well defined limits and the mold part or parts can readily be removed from the support or supports when necessary.

The invention is particularly applicable to plural cavity molds as it is in these that the inequalities of expansion effects are most marked but it may also be applied to single cavity molds.

In order that the said invention may be clearly understood and readily carried into effect, the same will now be more fully described with reference to the accompanying drawing, in which:—

Figure 1:
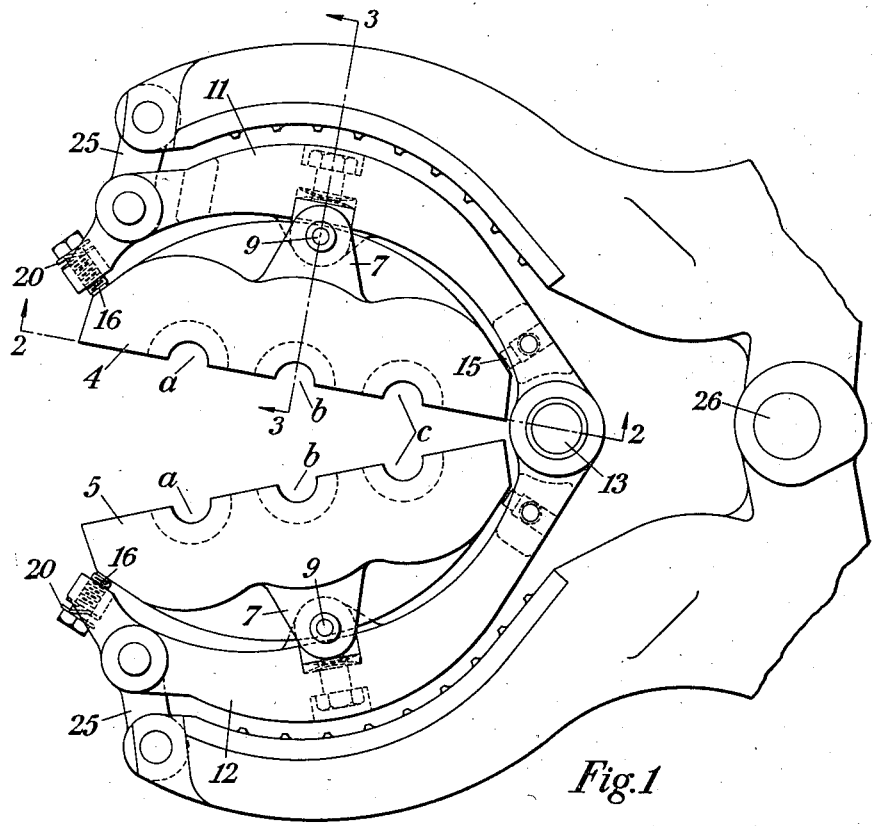
Fig. 1 is a plan view of one form of a hingeless mold with its associated mold mounting elements produced in accordance with the invention.
Figure 2:
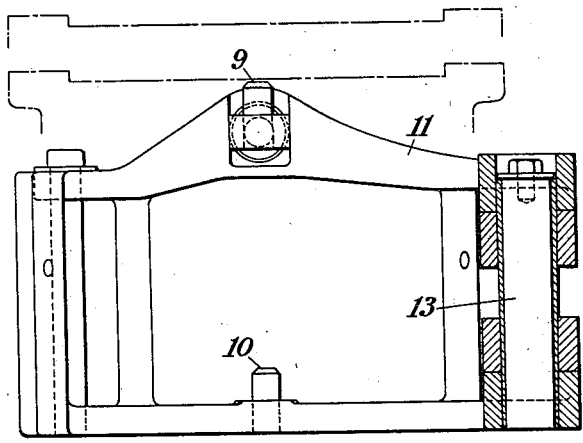
Fig. 2 is a side elevation of one of the mold mountings or arms shown in Fig. 1 looking in the direction of the arrows 2—2 shown in the latter figure.
Figure 3:
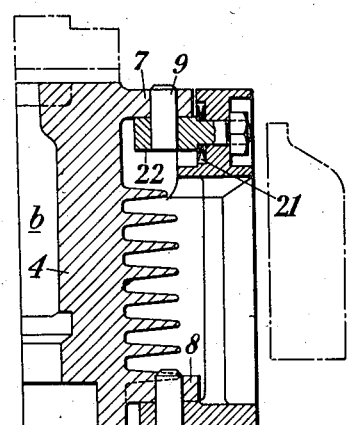
Fig. 3 is a vertical section through the mold arm shown in Fig. 2 and through a mold part mounted in position thereon, the section being taken on the line 3—3 of Fig. 1.

In the accompanying drawing the invention has been illustrated as applied to a triple cavity mold comprising two similar mold parts or halves 4 and 5, each having three cavities a, b and c which, when the mold is closed, form three separate cavities or chambers corresponding in shape with the shape of the ware required to be produced. It will be observed that the mold parts are entirely separate from one another and are not hingedly connected with one another as is frequently the case. On the contrary, each mold part is provided on the exterior surface thereof with a pair of lugs 7 and 8 one of which is located near the upper end thereof and the other of which is located near the lower end thereof, the said lugs being formed with suitable openings enabling them to fit over a pair of vertically disposed pivot pins 9 and 10 mounted in position upon each of a pair of mold arms 11 and 12 hingedly connected together at 13 in such a manner that by movement of the mold arms about their hinge the mold can be opened and closed. The mold arms are preferably of such a length and shape that they extend over almost the entire width of the exterior surfaces of the mold parts and follow approximately the contour thereof and are of such a shape or design as will allow of efficient cooling of the molds from the cooling air supply provided on the machine. Each mold arm is also provided with at least two mold locating or adjusting pins 15 and 16 one of which is adapted to protrude slightly from the inner surface of the mold arm at a point adjacent its hinge and the other of which is adapted to protrude from the inner surface at a point adjacent the free end of the mold arm. These locating pins are arranged so that they bear against suitably machined faces provided upon the exterior surfaces of the mold parts and one or both of the pins on each arm is adjustable so that they serve accurately to locate the mold parts in their desired positions upon the mold arms. Preferably one of the pins on one or both of the mold arms, for instance, the outer pin 16, is adapted to provide for a certain but limited amount of play or movement of the mold part or parts about its pivotal mounting as the mold closes so as to ensure under all conditions of working a proper closing of the mold with the so-called meeting faces substantially in contact of their entire area.

Also, provision is preferably made for a limited amount of relative or aligning movement of the mold parts in a vertical plane. For instance, one of the pivots 9 and 10 may be mounted in its mold arm so that it will be free to move by a small amount relatively to the mold arm so the mold closes if meeting faces are not initially brought into proper contact. In the arrangement shown, this is provided for by interposing a pair of oppositely dished washers 21 between a flanged part of a horizontal pin 22 carrying the upper pivot pin 9 and the adjacent surface of mold arm. It will be appreciated, however, that, in some instances, it may be necessary or advisable to provide a mounting of this nature for the lower pivot pin 10 instead of the upper pivot pin.

From the foregoing it will also be appreciated that one or both of the mold parts is or are mounted in position upon the supporting mold arm or arms so that it is floating or free to move relatively to the arm or arms between certain well defined and adjustable limits, it being understood that the amount of permissible movement must always necessarily be extremely small and only such as will accommodate or take-up any slight mis-alignment necessary for enabling the proper closing of the mold. Usually the amount of permissible movement will be of the order of a few thousandths of an inch and at its maximum should not be more than a few hundredths of an inch.

The pivotal mounting of the mold parts in the manner above described also greatly facilitates the removal or changing of the molds when a different shape or type of ware is required since the mold parts can readily be slipped into and out of position on their pivotal supports without in any way disturbing the hinge mounting of the mold arms.

For the purpose of effecting the opening and closing movements of the mold the mold arms may be coupled, as by short links 25, to a pair of scissor arms hingedly connected together at 26 and suitably connected to a cam-actuated or other known form of mold opening and closing means.

Having thus described my invention what I claim as new therein and desire to secure by Letters Patent is:—

1. An improved form of mold and mold mounting for glass forming machines comprising a mold made up of two separate but co-operating parts pivotally supported upon a pair of hingedly connected mold arms, one pivot pin near the upper portion of each mold arm, a second pivot pin near the lower portion of each mold arm, portions of the mold parts fitting over said pins and means for adjusting the mold parts about their pivot pins.

2. An improved form of mold and mold mounting for glass forming machines comprising a mold made up of two separate but co-operating parts pivotally supported upon a pair of hingedly connected mold arms, one pivot pin near the upper portion of each mold arm, a second pivot pin near the lower portion of each mold arm, means enabling the mold parts to float freely on the said pivot pins, and means for adjusting the mold parts.

FREDERICK ARTHUR HARRISON.